US012766536B2

(12) United States Patent
Repetto et al.

(10) Patent No.: US 12,766,536 B2
(45) Date of Patent: Oct. 20, 2026

(54) TRIGGER DISPENSING HEAD WITH NOZZLE ASSEMBLY

(71) Applicant: GUALA DISPENSING S.P.A., Alessandria (IT)

(72) Inventors: Massimo Repetto, Alessandria (IT); Alessandro Pigazzi, Alessandria (IT)

(73) Assignee: Guala Dispensing S.P.A., Alessandria (IT)

(*) Notice: Subject to any disclaimer, the term of this patent is extended or adjusted under 35 U.S.C. 154(b) by 597 days.

(21) Appl. No.: 18/008,333

(22) PCT Filed: Jun. 3, 2021

(86) PCT No.: PCT/IB2021/054860
§ 371 (c)(1),
(2) Date: Dec. 5, 2022

(87) PCT Pub. No.: WO2021/245588
PCT Pub. Date: Dec. 9, 2021

(65) Prior Publication Data

US 2023/0201851 A1 Jun. 29, 2023

(30) Foreign Application Priority Data

Jun. 5, 2020 (IT) ........................ 102020000013405

(51) Int. Cl.
*B05B 11/00* (2023.01)
*B05B 7/00* (2006.01)
*B05B 11/10* (2023.01)

(52) U.S. Cl.
CPC .......... *B05B 11/1064* (2023.01); *B05B 7/005* (2013.01); *B05B 11/007* (2013.01); *B05B 11/1067* (2023.01)

(58) Field of Classification Search
CPC ............. B05B 11/1011; B05B 11/1057; B05B 11/0005; B05B 7/0062; B05B 1/12;
(Continued)

(56) References Cited

U.S. PATENT DOCUMENTS 5,366,160 A * 11/1994 Balderrama ........ B05B 11/0005 239/432
5,397,060 A * 3/1995 Maas .................... B05B 7/0062 239/432

(Continued)

FOREIGN PATENT DOCUMENTS

EP 1103308 A2 5/2001
EP 3345681 A1 7/2018

(Continued)

OTHER PUBLICATIONS

International Search Report for International Patent Application No. PCT/IB2021/054860, mailed Sep. 21, 2021.

*Primary Examiner* — Charles P. Cheyney
(74) *Attorney, Agent, or Firm* — Armstrong Teasdale LLP

(57) ABSTRACT

Provided is a dispensing head with a trigger for a dispensing device having a frame, a piston chamber, a piston, a dispensing duct, a suction duct, pre-compression valve means, suction valve means, and a nozzle assembly having a nozzle and a dual chamber foamer. The dispensing head is particularly effective for dispensing products with sanitizing and antimicrobial effect.

12 Claims, 8 Drawing Sheets

(58) Field of Classification Search
CPC . B05B 7/005; B05B 11/1064; B05B 11/1067; B05B 11/007
USPC ........................ 239/333, 343; 222/383.1, 190
See application file for complete search history.

(56) References Cited

U.S. PATENT DOCUMENTS

| | | | | |
|---|---|---|---|---|
| 5,678,765 | A * | 10/1997 | Dobbs | B05B 11/0005 239/512 |
| 5,702,058 | A * | 12/1997 | Dobbs | B05B 11/0005 239/333 |
| 5,755,384 | A * | 5/1998 | Foster | B05B 1/02 239/333 |
| 6,557,783 | B1 * | 5/2003 | Foster | B05B 1/3468 239/514 |
| 9,302,284 | B2 * | 4/2016 | Alluigi | B05B 11/007 |
| 9,962,724 | B2 * | 5/2018 | Fujiwara | B05B 11/1002 |
| 10,518,281 | B2 * | 12/2019 | Fujiwara | B05B 1/02 |
| 10,654,052 | B2 * | 5/2020 | Fujiwara | B05B 11/0029 |
| 10,799,893 | B2 * | 10/2020 | Fujiwara | B05B 11/1011 |
| 11,571,703 | B2 * | 2/2023 | Alluigi | G01F 11/028 |
| 2004/0251316 | A1 * | 12/2004 | Stark | B05B 11/0029 239/333 |
| 2009/0256008 | A1 * | 10/2009 | Foster | B05B 7/005 239/589 |
| 2011/0180619 | A1 * | 7/2011 | Konishi | B05B 11/0037 222/323 |
| 2017/0014844 | A1 * | 1/2017 | Fujiwara | B05B 7/005 |

FOREIGN PATENT DOCUMENTS

| | | | |
|---|---|---|---|
| JP | 65667551 | A | 6/1981 |
| WO | 2014013352 | A1 | 1/2014 |
| WO | 2015145399 | A1 | 10/2015 |

* cited by examiner

TRIGGER DISPENSING HEAD WITH NOZZLE ASSEMBLY

CROSS-REFERENCE TO RELATED APPLICATIONS

This application is a National Stage Application of International Patent Application No. PCT/IB2021/054860, having an International Filing Date of Jun. 3, 2021, which claims priority to Italian Application No. 102020000013405, filed Jun. 5, 2020, the entire contents of which are hereby incorporated by reference herein.

FIELD OF THE INVENTION

The present invention is in the field of trigger dispensing devices for liquid products, generally used for household hygiene, air freshening, ironing of clothing, personal care, plant care, animal care, etc.

BACKGROUND OF THE INVENTION

These devices are enormously popular; several hundred million are produced each year. In particular, the present invention relates to a trigger dispensing head applicable to a bottle, provided with a nozzle assembly for dispensing the product, particularly suitable for dispensing surface cleaning products.

In the home hygiene industry, cleaning vertical surfaces, such as bathroom wall tiles, particularly near fixtures, and downward-facing surfaces, such as the edges of bathroom fixtures, plays an essential role. Such surfaces are problematic, as the sprayed product, initially in foam form, tends to slide off or drip off, without remaining on the surface long enough to ensure sanitization or intervention by a user.

The volume of foam generated by the product, the persistence time of this volume, and the drip rate along a vertical surface depend on the technical and functional features of the dispensing head and the composition of the product, as illustrated, for example, in the International Application WO-A1-2015/145399.

SUMMARY OF INVENTION

The object of the present invention is to meet the needs of the industry and to overcome the drawbacks discussed above with reference to the prior art. This object is achieved by a dispensing head as described and claimed herein. Additional advantageous embodiments are also described.

BRIEF DESCRIPTION OF THE DRAWINGS

The features and advantages of the dispensing head according to the present invention will be apparent from the description below, given by way of non-limiting example in accordance with the figures in the appended tables, wherein.

DETAILED DESCRIPTION

Figure 1:
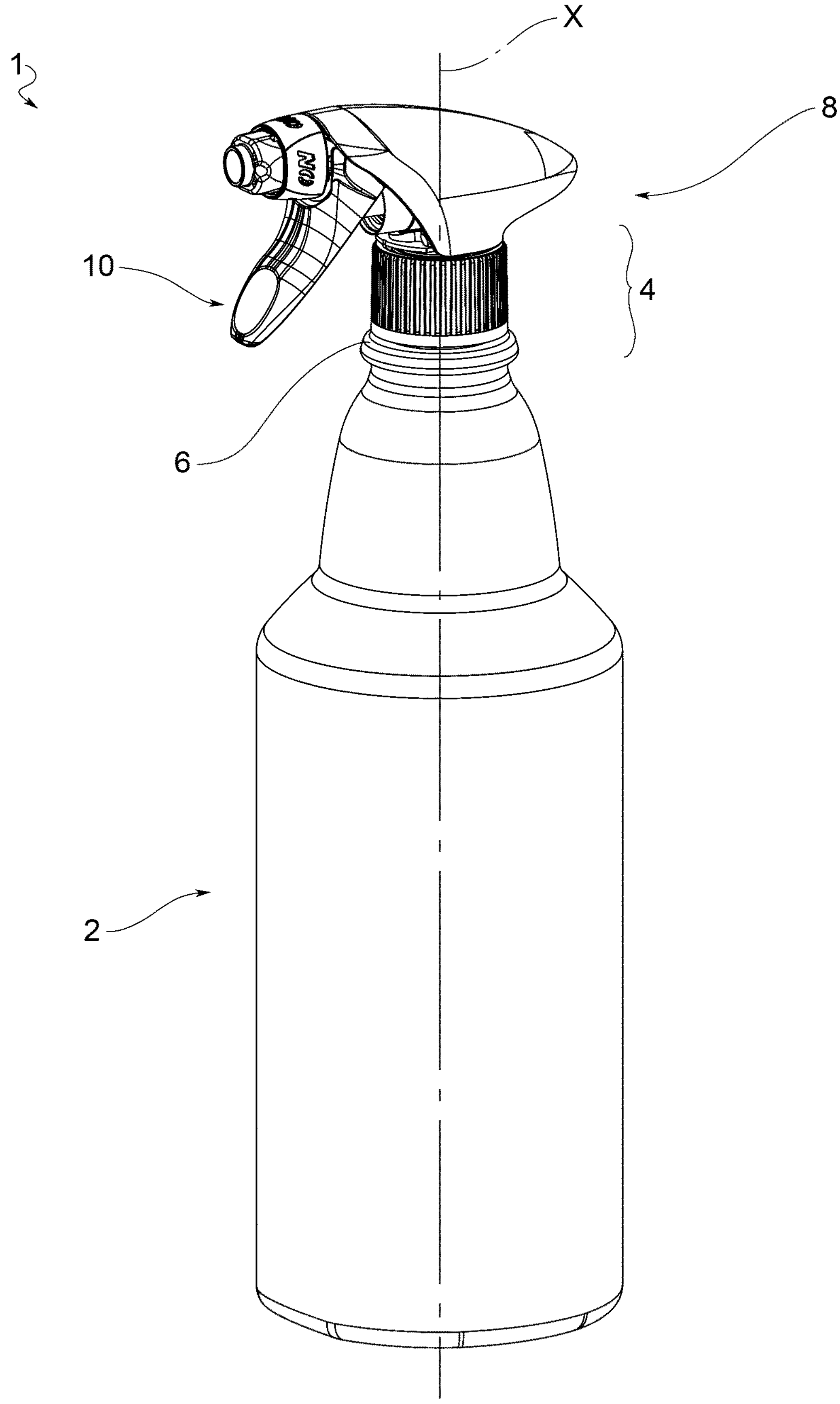
FIG. 1 depicts a trigger dispensing device according to one embodiment of the present invention.
Figure 2:
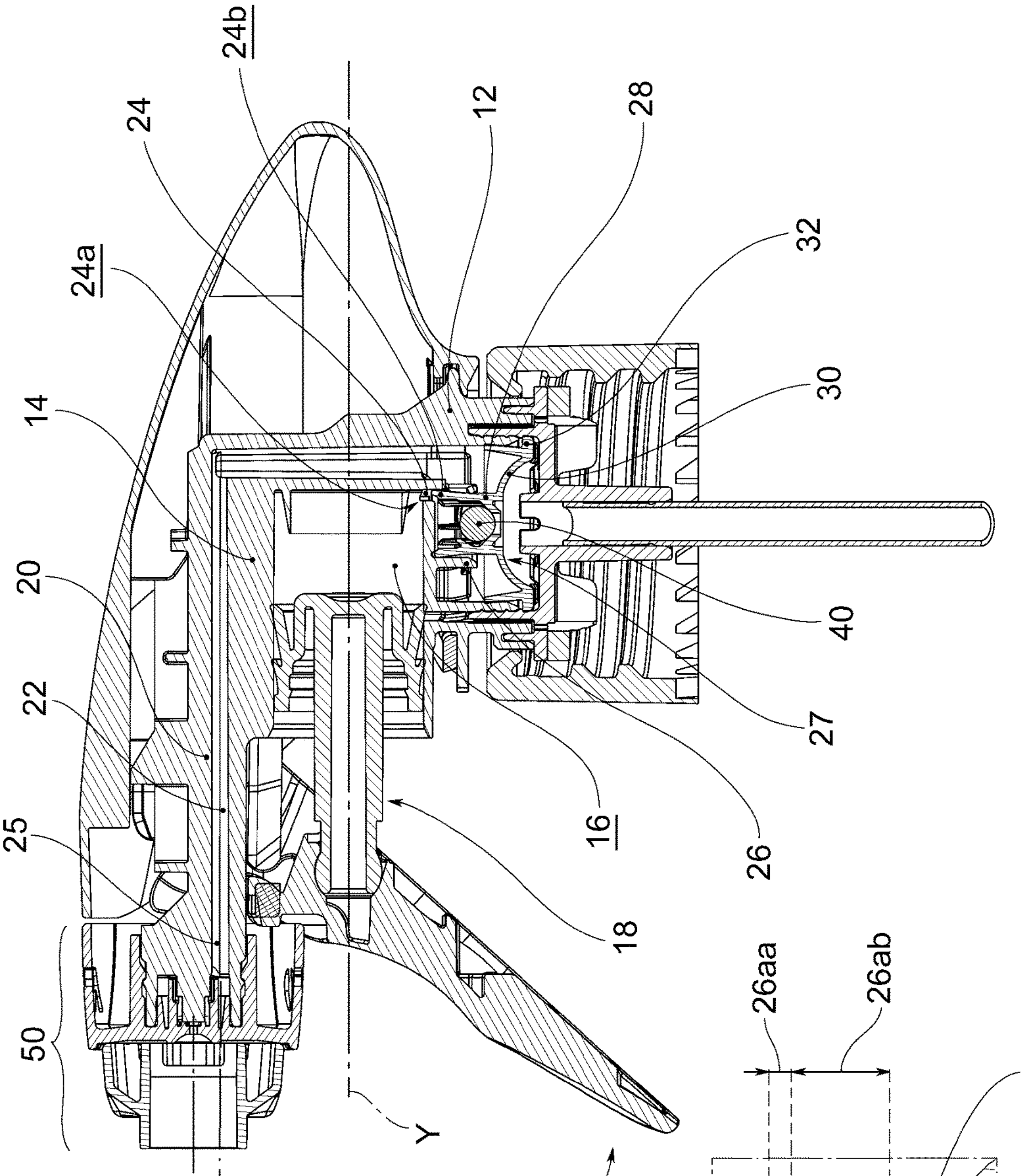
FIG. 2 represents a cross-sectional view of a trigger dispensing head of the dispensing device in FIG. 1.
Figure 3:
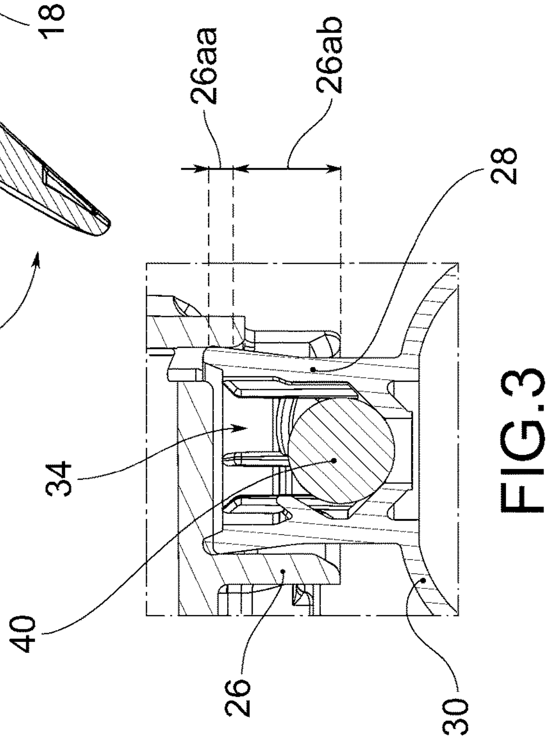
FIG. 3 illustrates an enlargement of a region of FIG. 2, showing pre-compression means of the dispensing head in FIG. 2.
Figure 4:
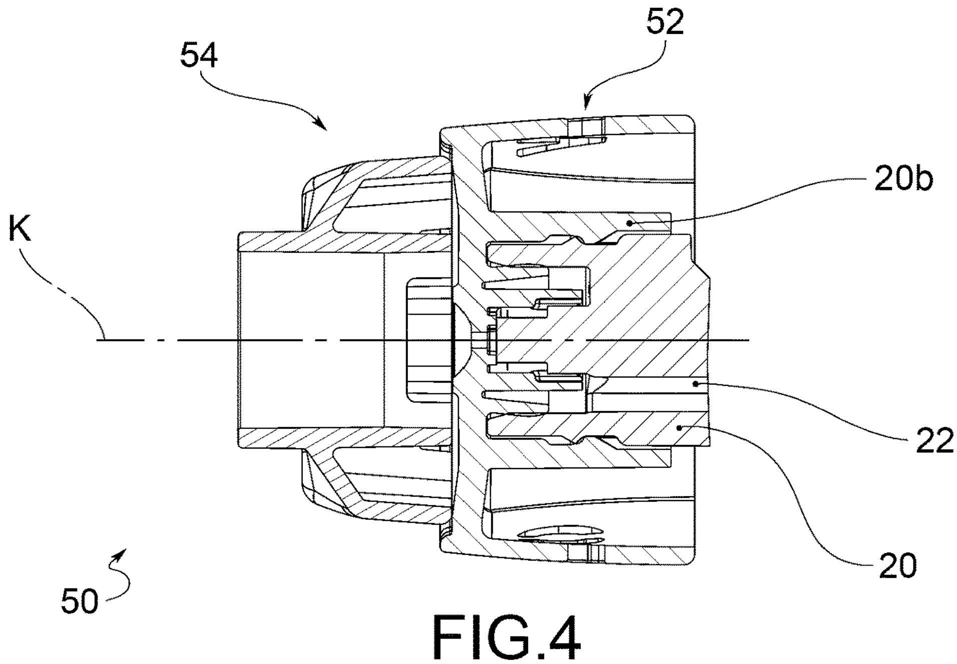
FIGS. 4 and 5 show cross-sectional views of a nozzle assembly of the dispensing head in FIG. 2.
Figure 5:
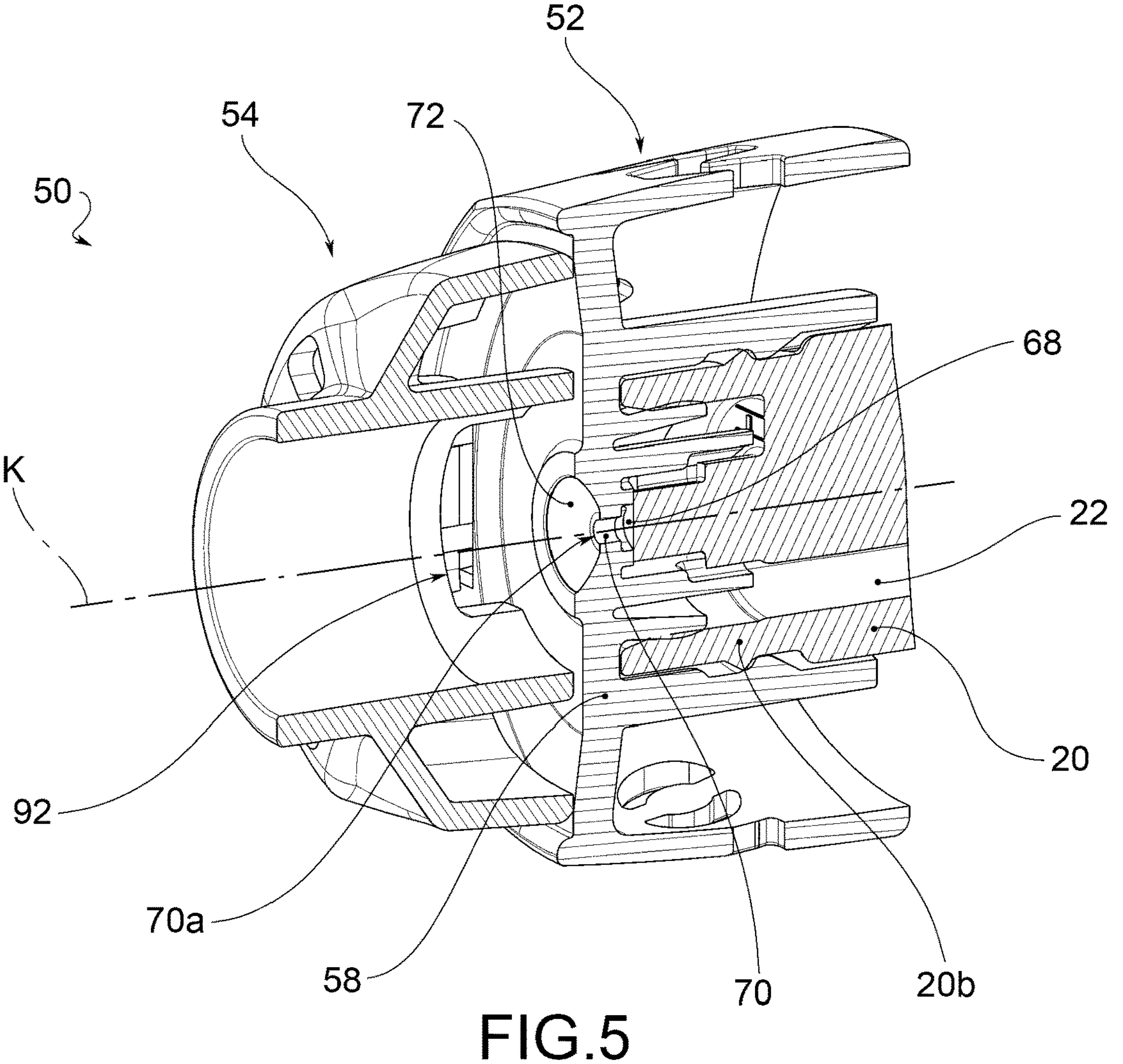
Figure 6:
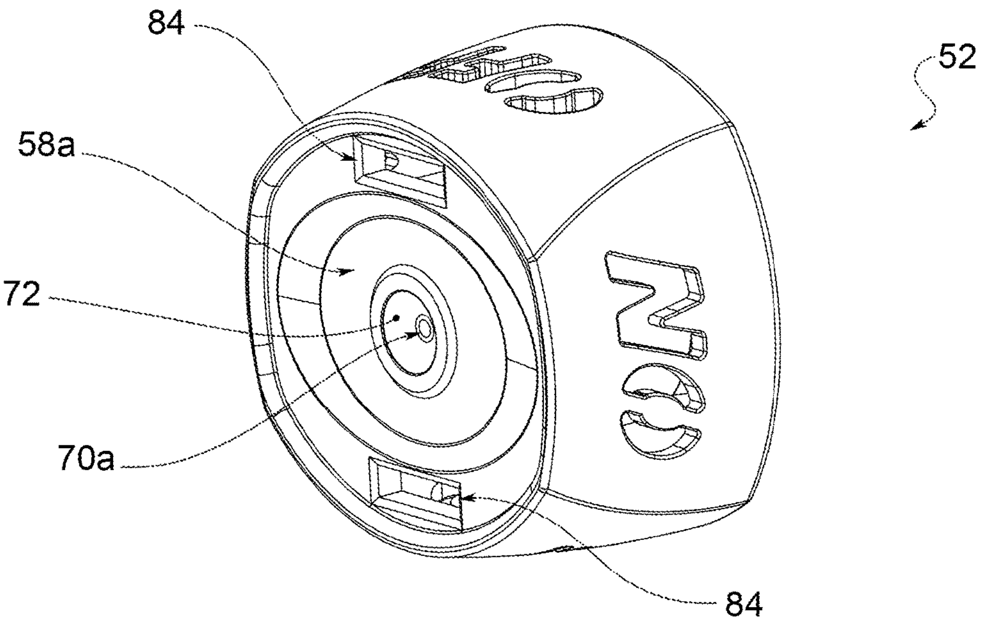
FIG. 6 shows a nozzle from the nozzle assembly in FIGS. 4 and 5.
Figure 7:
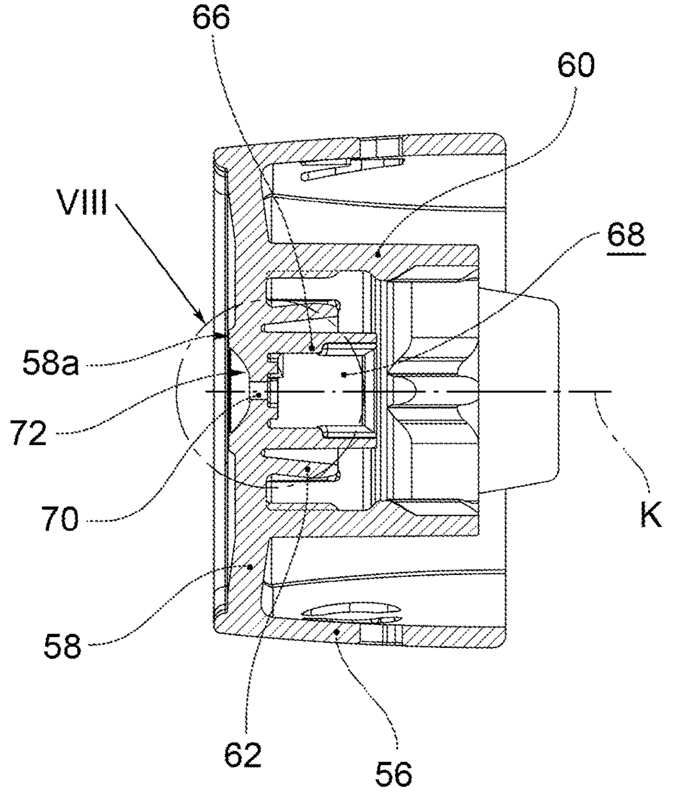
FIG. 7 is a cross-sectional view of the nozzle in FIG. 6.
Figure 8:
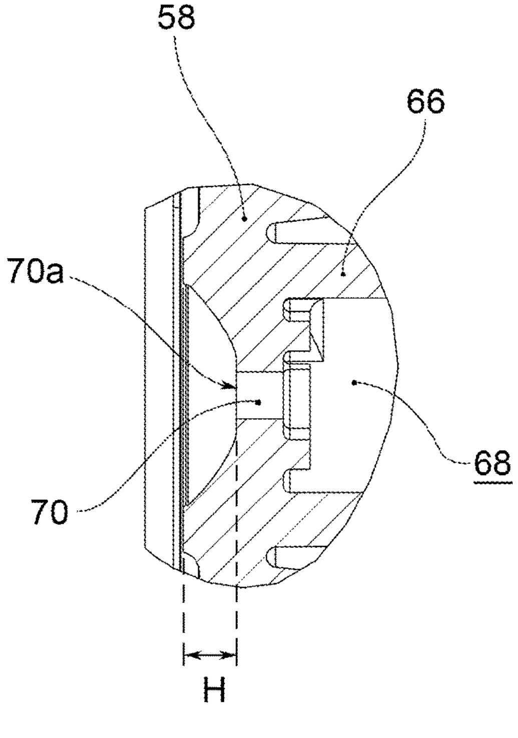
FIG. 8 illustrates an enlargement of the box VIII in FIG. 7, showing a nozzle passage of the nozzle.
Figure 9:
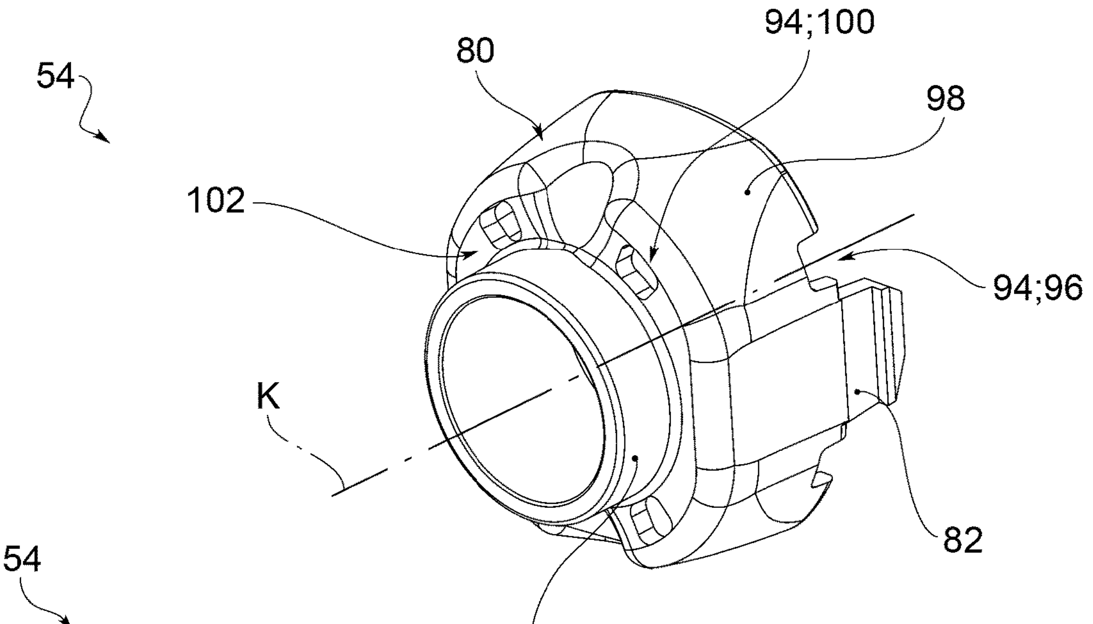
FIG. 9 depicts a foamer of the nozzle assembly in FIGS. 4 and 5.
Figure 10:
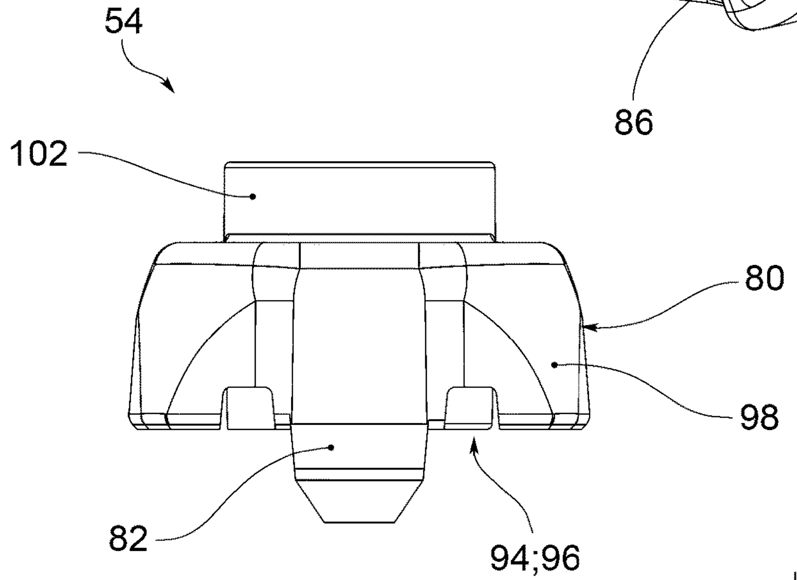
FIG. 10 represents a first side view of the foamer in FIG. 9.
Figure 11:
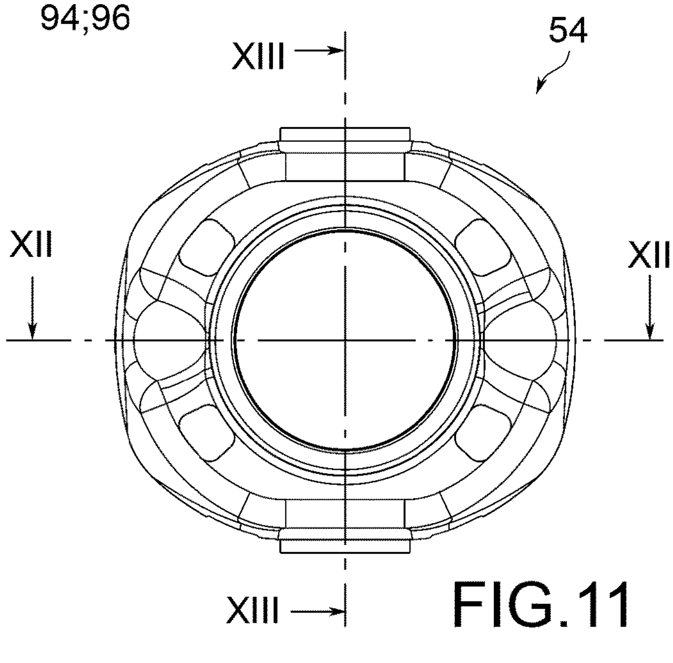
FIG. 11 shows a front anterior view of the foamer in FIG. 9.
Figure 12:
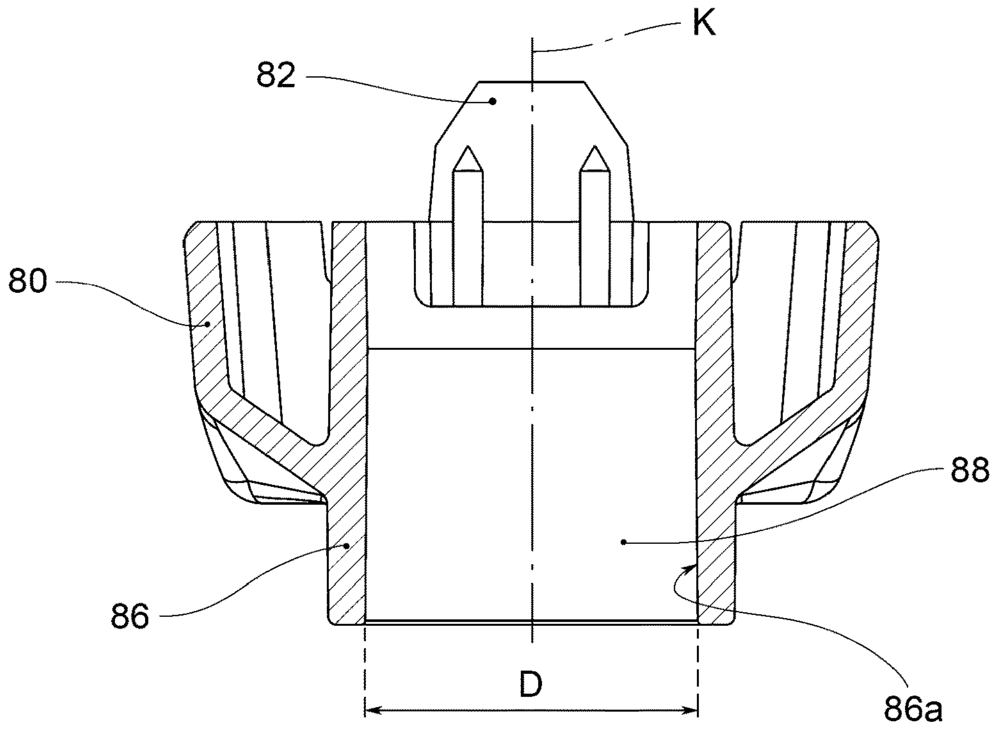
FIG. 12 shows a cross-sectional view of the foamer in FIG. 9, according to the cross-sectional plane XII-XII in FIG. 11.
Figure 13:
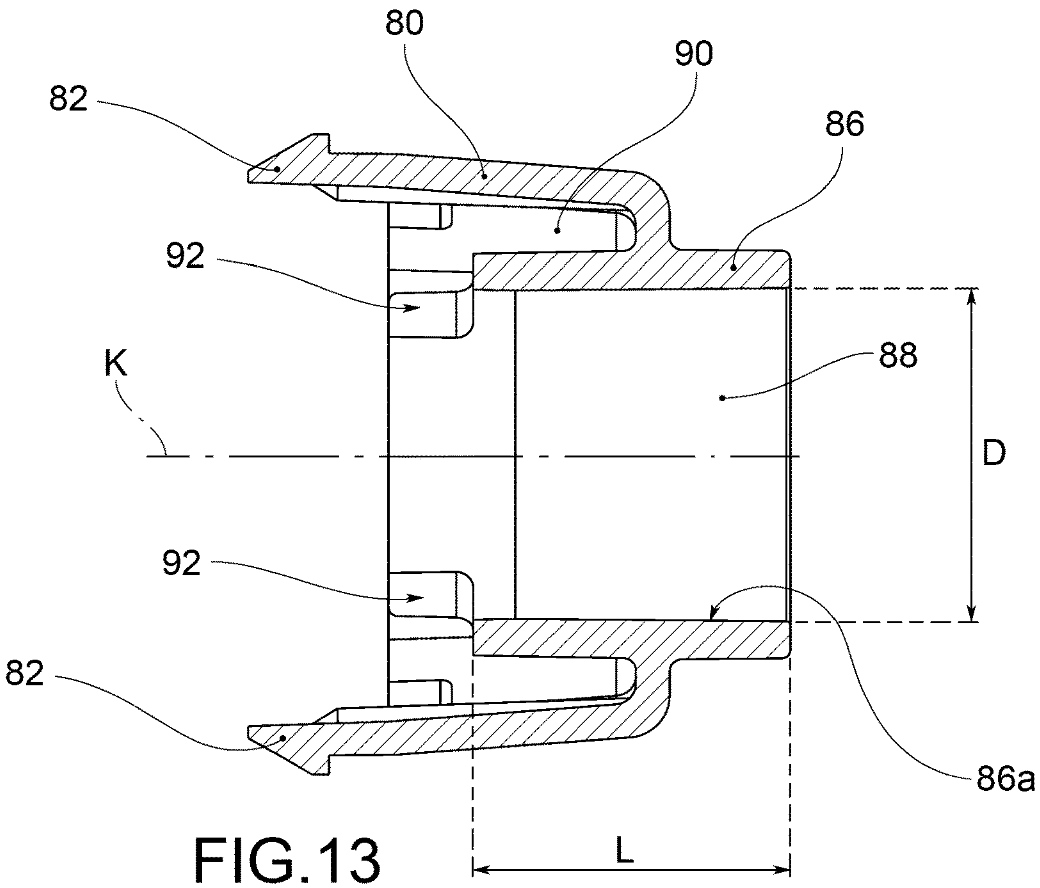
FIG. 13 depicts a cross-sectional view of the foamer in FIG. 9, according to the cross-sectional plane XIII-XIII in FIG. 11.
Figure 14:
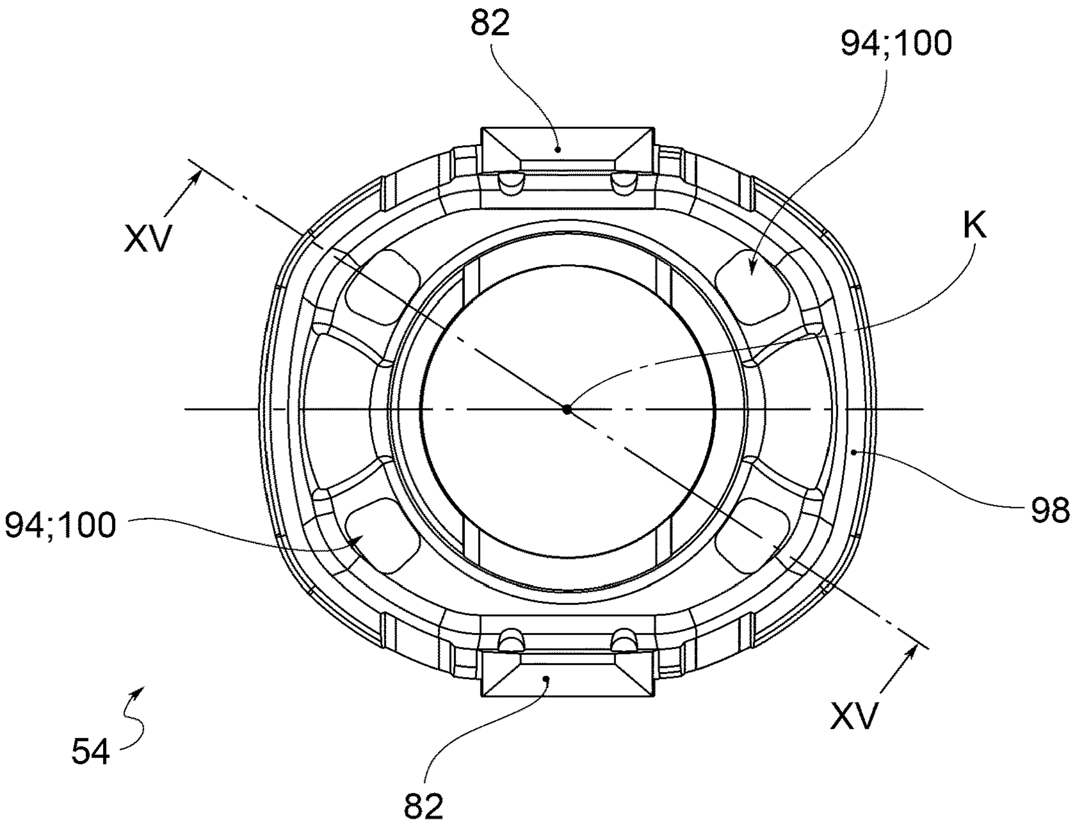
FIG. 14 shows a front posterior view of the foamer in FIG. 9.
Figure 15:
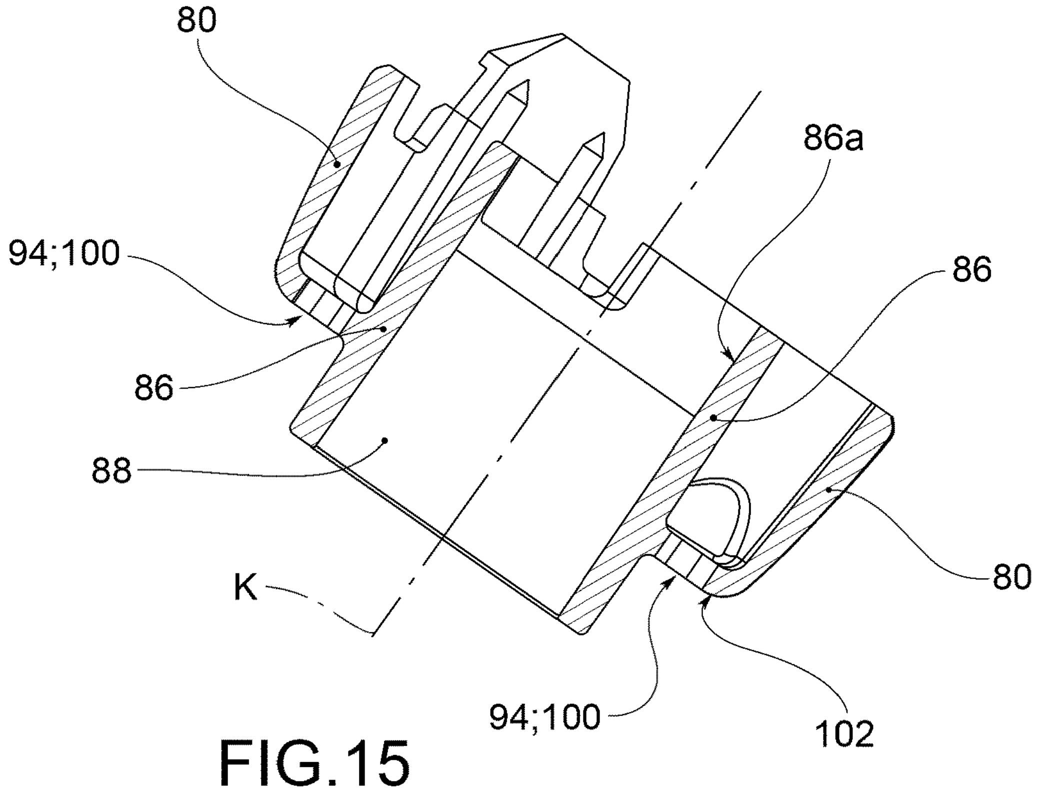
FIG. 15 depicts a cross-sectional view of the foamer in FIG. 9, according to the cross-sectional plane XV-XV in FIG. 14.
Figure 16:
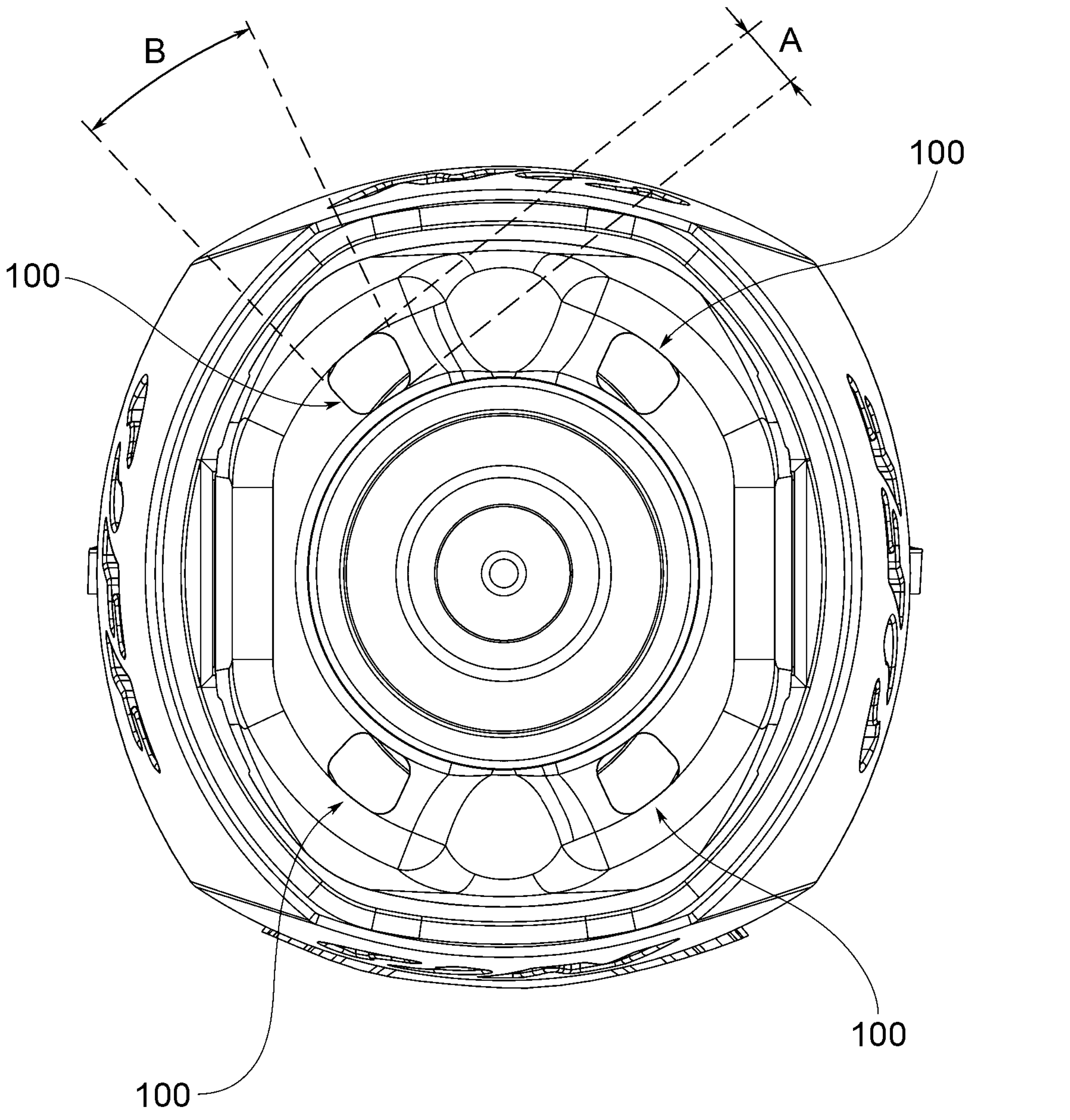
FIG. 16 illustrates a further front anterior view of the foamer in FIG. 9.

With reference to the figures in the appended tables, reference 1 refers to a trigger dispensing device as a whole comprising a bottle having a neck 4, comprising an annular neck wall 6 extending along a central neck axis X, and a dispensing head 8 having a trigger 10, removably or unremovably applicable to the neck 4 of the bottle 2, for example by means of a threaded or bayonet connection.

The dispensing head 8 includes a frame 12 for supporting the components, preferably made in one piece of plastics material by injection molding.

The frame 12 supports a first annular wall 14 having extension along a piston axis Y, incident on the neck axis X, e.g., orthogonally; the first wall 14 delimits a piston chamber 16, wherein a piston 18, actuated by the trigger 10, is sealingly slidable. Preferably, the frame 12 comprises the first wall 14.

The frame 12 further supports a second annular wall 20 having extension along a dispensing axis Z, preferably parallel to the piston axis Y; the second wall 20 delimits a dispensing duct 22, adapted to be placed in communication with the piston chamber 16 and terminating with a dispensing end 25. Preferably, the frame 12 comprises the second wall 20.

The piston chamber 16 is in communication with a main duct 24 for the inlet of the product suctioned into the piston chamber 16 and for the outlet of the product to be dispensed from the piston chamber 16 toward the dispensing duct 22; the main duct 24, preferably formed through the thickness of the second wall 20, has an inner mouth **24*a* toward the piston chamber 16 and an opposite outer mouth 24*b***.

The frame 12 also supports an annular main wall 26, projecting from the second wall 20, which surrounds the outer mouth **24*b* of the main duct 24. The main wall 26 has an inner side main surface 26*a*. Preferably, the frame 12 comprises the main wall 26**.

On the main surface **26*a*, there is a sealing band 26*aa*, proximal to the outer mouth 24*b*, and a passage band 26*ab*, distal from the outer mouth 24*b*** and provided with a plurality of recesses forming passages for the product being dispensed.

The head 8 further comprises pre-compression valve means configured to operate between the main duct 24 and the dispensing duct 22 and adapted, in a dispensing step, to pass product from the piston chamber 16 to the dispensing duct 22 only when the product pressure in the piston chamber 16 exceeds a predefined threshold value and, in a suction step, to prevent the passage of air from the dispensing duct 22 to the piston chamber 16.

Said pre-compression valve means comprise a valve assembly 27 comprising a tang 28, an elastically deformable membrane 30, and an engagement portion 32. Preferably, the valve assembly 27 is made in one piece of plastics material typically by injection molding.

The tang 28 has a sliding portion on the main surface 26*a* of the main wall 26.

In a resting configuration, the tang 28 is in contact with the sealing band 26*aa* of the main surface 26*a*. During an initial sub-step of the dispensing step, wherein, by actuating the trigger, the pressure of the product in the piston chamber 16 increases, the tang 28 slides, while maintaining contact with the sealing band 26*aa*, and the product does not pass to the dispensing duct 22. During a second sub-step of the dispensing step, at the beginning of which the product pressure is greater than or equal to the predefined threshold pressure, the tang 28 slides on the passage band 26*ab*, so as to allow the passage of the product outside the tang, toward the dispensing duct.

In addition, the tang 28 is penetrated by a suction duct 34 adapted to place the main duct 24 in communication with the compartment inside the bottle 2.

The head 8 further comprises suction valve means configured to operate along the suction duct 34. For example, said suction valve means comprise a ball 40, movable in the suction duct 34 between a closed position, assumed in the dispensing configuration wherein it occludes the suction duct 34 and prevents passage of product to the bottle compartment, and an open position, assumed in the suction configuration wherein it at least partially frees the dispensing duct 34.

Additional structural and functional details of the pre-compression and suction valve means are set forth in the International Application WO-A1-2014/013352, in the name of the Applicant, the teaching of which is incorporated herein.

The dispensing head 8 further comprises a nozzle assembly 50, applied to an annular end section 20*b* of the second wall 20, which defines a nozzle axis K, parallel to the dispensing axis Y.

The nozzle assembly 50 comprises a nozzle 52 applied to the end section 20*b*, preferably in a rotatable manner about the nozzle axis K between an open configuration and a closed configuration, and a foamer 54 attached to the nozzle 52.

The nozzle 52, preferably made in one piece of plastics material, comprises an annular grip wall 56, coaxial to the nozzle axis K, and a base 58, orthogonal to the nozzle axis K, from which the grip wall 56 protrudes axially. The grip wall 56 is adapted to be maneuvered to rotate the nozzle 52 relative to the nozzle axis K.

The nozzle 52 further comprises an annular connection wall 60, located radially internally to the grip wall 56, projecting axially from the base 58, adapted to snap-connect to the outer surface of the end section 20*b*, and an annular sealing lip 62, located radially internally to the connection wall 60, adapted to form a seal with the inner surface of the end section 20*b*.

The nozzle 52 further comprises an annular channeling wall 66, located radially internally to the sealing lip 62 and protruding axially from the base 58, which delimits a nozzle chamber 68 in communication with the dispensing duct 22 in the open nozzle configuration 52.

The base 58 of the nozzle 52 has a nozzle passage 70 through its thickness, coaxial to the nozzle axis K, which places the nozzle chamber 68 in communication with the exterior, emerging, via an outer mouth 70*a*, on an outer face 58*a* of the base 58.

In particular, said outer face 58*a* has a depression zone 72, which forms a dip on said outer face 58*a*, coaxial to the nozzle axis K, in which said outer mouth 70*a* opens. Said zone 72 has a depth H, at which said outer mouth 70*a* is located. The depth H is preferably between 0.7-1 millimeter, preferably between 0.8-0.9 millimeters, preferably is 0.85 millimeters.

The foamer 54 is applied, preferably by snap-connection, to the nozzle 52 and provides for a mixture of the product with the air coming from the external environment so as to generate a foam having the desired characteristics.

The foamer 54, preferably made in one piece of plastics material, for example by injection molding, comprises an annular outer wall 80, preferably comprising a pair of flaps 82 adapted to snap into respective windows 84 open on the base 58 of the nozzle 52. The engagement between the flaps 82 and the windows 84 achieves the engagement between the foamer 54 and the nozzle 52.

Additionally, the foamer 54 comprises an annular inner wall 86 having a preferably circular cylindrical, preferably smooth (i.e., free of ridges) inner surface 86*a*, coaxial to the nozzle axis K. The inner wall 86 delimits an inner chamber 88, into which the nozzle passage 70 of the nozzle 52 flows.

For example, the inner surface 86*a* has an axial length L of between 8-11 millimeters, preferably between 9-10 millimeters, preferably 9.5 millimeters. Furthermore, for example, the inner surface 86*a* has a diameter D of between 6-9 millimeters, preferably between 7-8 millimeters, preferably 7.9 millimeters.

On the other hand, an outer chamber 90 is delimited between the outer wall 80 and the inner wall 86.

Through the inner wall 86 is provided at least one inner opening 92, preferably formed in a proximal section 86*a* of the inner wall 86, proximal to the base 58 of the nozzle; for example, the inner opening 92 opens at the edge of said proximal section 86*a*. The inner opening 92 places the outer chamber 90 of the foamer 54 in communication with the inner chamber 88 of said foamer 54.

Preferably, moreover, at least one outer opening 94 is formed through the outer wall 80, which places the external environment in communication with the outer chamber 90 of the foamer.

In particular, the outer wall 80 provides at least one side outer opening 96 formed in an end section 98 of the outer wall 80, proximal to the base 58 of the nozzle 52, and at least one front outer opening 100 formed in a front region 102 of the outer wall 80, connecting the outer wall 80 with the inner wall 86. Said front outer opening 100 is contained on an imaginary plane orthogonal to the nozzle axis K.

Preferably, each front outer opening 100 has a radial width A of 0.5-2.5 millimeters, preferably 1-2 millimeters, preferably 1.55 millimeters. Further, preferably, each outer opening 100 has an angular opening B, preferably between 10°-25°, preferably between 15°-20°, preferably 18°.

According to a preferred embodiment, four front outer openings 100 are provided, angularly equally spaced on the front region 102.

During dispensing of the product from the outer opening mouth 70*a* of the nozzle 52, air is drawn from the external environment into the outer chamber 90 through the outer openings 94, 96, 100, and from the outer chamber 90 to the inner chamber 88 through the inner openings 92, thereby arriving in the inner chamber 88 to mix with the product, producing the desired foam.

Innovatively, the dispensing head described above, equipped with the nozzle assembly, meets the needs of the industry, as it makes a foam having a high volume compared to the initial volume of the liquid product, and a long persistence time on a vertical surface, without dripping.

In particular, advantageously, the dispensing head according to the present invention has shown excellent performance with regard to the volume of foam generated by the product, the persistence time of this volume and the dripping speed along a vertical surface, even with products having peculiar formulations, having, in addition to a high cleaning power, a significant sanitizing and antimicrobial effect.

In particular, the head according to the present invention has shown excellent performance with products having a composition comprising one or more of the substances contained in one of the following groups:

group I: Sodium nonyl sulphate, Sodium Hypochlorite, Sodium Chloride, Sodium Hydroxide, Lauramine Oxide;

group II: Sodium C8-10 Alkyl Sulfate, Sodium Hypochlorite, Sodium Hydroxide, Lauramine Oxide.

Moreover, in particular, the head according to the present invention has shown excellent performance with strongly alkaline products (pH >11).

It is understood that a person skilled in the art, in order to meet contingent needs, could make modifications to the dispensing head described above, all of which are contained within the scope of protection as defined by the following claims.

What is claimed is:

1. A dispensing head with a trigger for a dispensing device, comprising:

a frame applicable to a bottle of the dispensing device;

a piston chamber supported by the frame and a piston sealingly slidable in the piston chamber along a piston axis, the piston being actuated by the trigger;

a dispensing duct in communication with the piston chamber to bring a product to be dispensed from the piston chamber towards an external environment, ending with a dispensing end;

a suction duct in communication with the piston chamber to bring the product from the bottle to the piston chamber;

pre-compression valve means configured to operate between the piston chamber and the dispensing duct to allow the product to pass, during a dispensing step, from the piston chamber towards the dispensing duct only when pressure in the piston chamber exceeds a predefined threshold value, and to prevent air from returning from the dispensing duct towards the piston chamber during a suction step;

suction valve means configured to operate between the piston chamber and the suction duct to allow passage of the product from the bottle to the piston chamber during the suction step and to prevent the product from returning from the piston chamber to the bottle during the dispensing step;

a nozzle assembly applied at the dispensing end of the dispensing duct, comprising a nozzle applied to the frame and equipped with a base provided with a nozzle passage having an outer mouth, and a foamer fastened to the nozzle and adapted to mix the product with air from the external environment to generate a foam;

wherein the foamer comprises:

an annular inner wall that delimits an inner chamber in which the nozzle passage emerges, the annular inner wall comprising at least one inner opening configured to permit air from an outer chamber to enter the inner chamber; and an annular outer wall, placed radially outside and concentric with the annular inner wall, the outer chamber being delimited circumferentially and continuously between the annular inner wall and the annular outer wall, the annular outer wall comprising at least one outer opening, so that during dispensing of the product from the outer mouth of the nozzle, air is drawn from the external environment into the outer chamber and through the at least one inner opening into the inner chamber to be mixed with the product and produce a desired foam;

wherein the annular outer wall of the foamer further comprises an end section proximal to the base of the nozzle, and wherein at least one side outer opening, formed as a discrete aperture extending through a thickness of the end section, opens in the end section, the end section being continuously annular about a nozzle axis except where interrupted by the at least one side outer opening.

2. The dispensing head of claim 1, wherein the foamer is snap applied onto the nozzle.

3. The dispensing head of claim 2, wherein the base of the nozzle comprises at least one window; and the annular outer wall of the foamer comprises at least one flap configured to be snap inserted into the at least one window to couple the foamer and the nozzle.

4. The dispensing head of claim 1, wherein the annular inner wall of the foamer comprises a proximal section, proximal to the base of the nozzle, and wherein the at least one inner opening opens through the proximal section.

5. The dispensing head of claim 4, wherein the at least one inner opening opens at an edge of the proximal section.

6. The dispensing head of claim 1, wherein the annular outer wall comprises a front region that connects the annular outer wall with the annular inner wall, at least one front outer opening crossing the front region.

7. The dispensing head of claim 6, wherein the at least one front outer opening is contained on an imaginary plane orthogonal to a nozzle axis.

8. The dispensing head of claim 6, wherein four front outer openings are provided, angularly equally spaced on the front region.

9. The dispensing head of claim 1, wherein the base of the nozzle comprises an outer face on which the outer mouth of the nozzle passage emerges, and wherein the outer face has a depression area that forms a dip, inside which the outer mouth opens.

10. The dispensing head of claim 1, wherein the piston chamber is connectable to the dispensing duct by a main duct having an inner mouth facing towards the piston chamber, and an opposite outer mouth;

a main wall, supported by the frame, surrounds the outer mouth and has an inner side main surface on which there are a sealing band, proximal to the outer mouth, and a passage band, distal from the outer mouth and provided with a plurality of recesses forming passages for the product;

the pre-compression valves means comprise a valve assembly comprising a tang, an elastically deformable membrane and an engagement portion;

the tang has a portion slidable on the inner side main surface of the main wall and configured so that during a first sub-step of the dispensing step, wherein, via activation of the trigger, pressure of the product in the piston chamber increases, the tang slides maintaining contact with the sealing band, preventing passage of the product towards the dispensing duct; and during a second sub-step of the dispensing step, at the beginning of which pressure of the product is greater than or equal to a predefined threshold pressure, the tang slides on the passage band to allow passage of the product outside the tang, towards the dispensing duct.

11. A trigger dispensing device comprising:

a bottle for containing a product to be dispensed; and the dispensing head of claim 1, applied to the bottle.

12. A surface sanitation system, comprising:

a trigger dispensing device according to claim 11; and a product to be dispensed, wherein the product has a composition including one or more substances contained in one of the following groups:

group I: Sodium nonyl sulphate, Sodium Hypochlorite, Sodium Chloride, Sodium Hydroxide, Lauramine Oxide; and group II: Sodium C8-10 Alkyl Sulfate, Sodium Hypochlorite, Sodium Hydroxide, Lauramine Oxide.

* * * * *